(12) United States Patent
Ye et al.

(10) Patent No.: US 9,534,927 B2
(45) Date of Patent: Jan. 3, 2017

(54) MOBILE DEVICE AND MICROCONTROLLER UNIT

(71) Applicant: CYWEEMOTION HK LIMITED, Central (HK)

(72) Inventors: Zhou Ye, Foster City, CA (US); Chin-Lung Li, Taoyuan County (TW); Shun-Nan Liou, Taipei (TW); Chien-Chih Hsu, Taipei (TW)

(73) Assignee: CYWEEMOTION HK LIMITED, Central (HK)

(*) Notice: Subject to any disclaimer, the term of this patent is extended or adjusted under 35 U.S.C. 154(b) by 423 days.

(21) Appl. No.: 14/088,452

(22) Filed: Nov. 25, 2013

(65) Prior Publication Data

US 2014/0336989 A1 Nov. 13, 2014

Related U.S. Application Data

(63) Continuation-in-part of application No. 13/945,930, filed on Jul. 19, 2013, now abandoned, and a continuation-in-part of application No. 14/033,553, filed on Sep. 23, 2013, now Pat. No. 9,104,417.

(51) Int. Cl.
*G01D 11/00* (2006.01)
*G01D 3/10* (2006.01)
*G01C 22/00* (2006.01)

(52) U.S. Cl.
CPC .............. *G01D 3/10* (2013.01); *G01C 22/006* (2013.01)

(58) Field of Classification Search
CPC ......... G01D 11/00; G01D 3/10; G01C 22/006; H04W 4/02; H04W 4/022; H04W 4/026–4/027; H04W 64/00; H04W 64/003
See application file for complete search history.

(56) References Cited

U.S. PATENT DOCUMENTS 9,104,417 B2 * 8/2015 Ye ........................... G06F 1/3243
2008/0238772 A1 * 10/2008 Soloviev ................. G01S 19/22
342/357.25

OTHER PUBLICATIONS

Soloviev et al., Utilizing Multipath Reflections in Deeply Integrated GPS/INS Architecture for Navigation in Urban Environments, 2008 IEEE, pp. 383-393.*

* cited by examiner

*Primary Examiner* — Toan Le
(74) *Attorney, Agent, or Firm* — McClure, Qualey & Rodack, LLP

(57) ABSTRACT

A microcontroller unit (MCU) characterized by including a buffer is provided. The MCU is a part of a mobile device. The MCU fetches a plurality of samples from a sensor of the mobile device, performs a preset processing according to the samples, stores the samples and/or a result of the preset processing in the buffer, and provides the result or a signal based on the result to the central processing unit (CPU) of the mobile device or an electronic device.

24 Claims, 2 Drawing Sheets

MOBILE DEVICE AND MICROCONTROLLER UNIT

CROSS-REFERENCE TO RELATED APPLICATION

This application is a continuation-in-part application of and claims the priority benefit of a prior U.S. application Ser. No. 13/945,930, filed on Jul. 19, 2013 now pending. This application is also a continuation-in-part application of and claims the priority benefit of a prior U.S. application Ser. No. 14/033,553, filed on Sep. 24, 2013 now pending. The prior U.S. application Ser. No. 14/033,553 claims the priority benefit of China application serial no. 201320245496.X, filed on May 8, 2013. The entirety of each of the above-mentioned patent applications is hereby incorporated by reference herein and made a part of this specification.

BACKGROUND OF THE INVENTION

Field of the Invention

The present invention relates to a microcontroller unit (MCU) of a mobile device. More particularly, the present invention relates to an MCU including a buffer for storing samples for further processing and/or results of the processing.

Description of the Related Art

Nowadays a mobile device is often equipped with embedded sensors, such as accelerometer, gyro-sensor and magnetometer. The central processing unit (CPU) of the mobile device can collect samples generated by the sensors and perform some processing based on the samples. For example, the CPU can calculate the movement and the orientation of the mobile device or calculate how many steps the user of the mobile device has walked.

Since the sensors keep generating samples, the CPU has to receive and analyse the samples constantly. Therefore, the CPU has to be in its full operation mode for extended periods of time, which consumes electric power and shortens the battery life of the mobile device.

SUMMARY OF THE INVENTION

Accordingly, the present invention is directed to a mobile device and an MCU of such a mobile device. The mobile device delegates the task of collecting and analysing the samples generated by the sensor to the MCU to reduce power consumption.

According to an embodiment of the present invention, a mobile device is provided. The mobile device includes a sensor, an MCU and a CPU. The sensor generates a plurality of samples. The MCU is coupled to the sensor. The MCU includes a buffer. The MCU fetches the samples from the sensor, performs a first preset processing according to the samples, and storing the samples and/or a result of the first preset processing in the buffer. The CPU is coupled to the MCU. The CPU fetches the result from the MCU or receives a signal based on the result from the MCU. The CPU performs a second preset processing according to the result or the signal.

According to another embodiment of the present invention, a mobile device is provided. The mobile device includes a sensor and an MCU. The sensor generates a plurality of samples. The MCU is coupled to the sensor. The MCU includes a buffer. The MCU fetches the samples from the sensor, performs a preset processing according to the samples, stores the samples and/or a result of the preset processing in the buffer, and provides the result or a signal based on the result to an electronic device.

According to another embodiment of the present invention, an MCU characterized by including a buffer is provided. The MCU fetches a plurality of samples from a sensor, performs a preset processing according to the samples, stores the samples and/or a result of the preset processing in the buffer, and provides the result or a signal based on the result to an electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
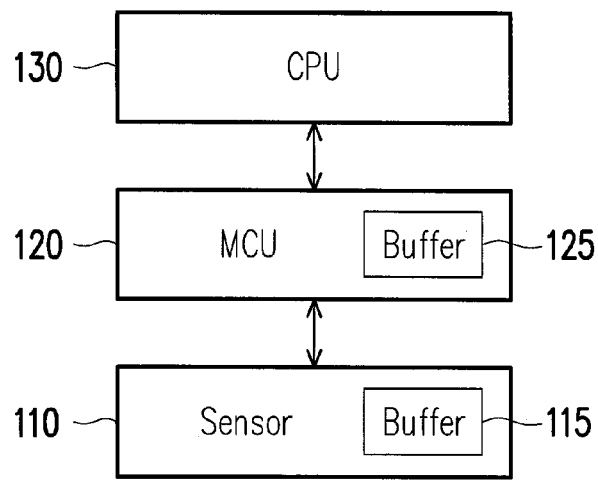
FIG. 1 is a schematic diagram showing a mobile device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a mobile device 100 according to an embodiment of the present invention. The mobile device 100 may be a remote controller, a smart phone, a personal digital assistant (PDA), a tablet computer, or a notebook computer, etc. The mobile device 100 includes a sensor 110, an MCU 120, and a CPU 130. The MCU 120 is coupled to the sensor 110. The CPU 130 is coupled to the MCU 120. The sensor 110 includes a buffer 115. The MCU 120 includes a buffer 125. The buffers 115 and 125 are storage devices, such as register or memory.

The sensor 110 generates a plurality of samples. The sensor 110 may store the samples in the buffer 115. The MCU 120 fetches the samples from the sensor 110 and performs an initial preset processing according to the samples to generate one or more results of the initial preset processing. The MCU 120 may store either the samples or the result(s) in the buffer 125. Alternatively, the MCU 120 may store both the samples and the result(s) in the buffer 125.

The CPU 130 fetches the one or more results from the MCU 120 or receives a signal based on the one or more results from the MCU 120. The CPU 130 performs further preset processing according to the one or more results or the signal from the MCU 120.

In an embodiment of the present invention, the sensor 110 generates the samples at a frequency $F_1$, which means the sensor 110 generates $F_1$ samples every second. The MCU 120 fetches the samples from the sensor 110 in batches at a frequency $F_2$. The CPU 130 fetches the results from the MCU 120 in batches at a frequency $F_3$. The frequency $F_1$ may be higher than or equal to the frequency $F_2$. The frequency $F_2$ may be higher than or equal to the frequency $F_3$.

For example, $F_1$ may be 2000 Hz, $F_2$ may be 1 Hz, and $F_3$ may be 0.001 Hz. The sensor 110 generates 2000 samples every second. The MCU 120 fetches the samples from the sensor 110 once in every second. In each fetching, the MCU 120 fetches the 2000 samples as a single batch from the sensor 110. After each fetching, the MCU 120 performs the initial preset processing and generates 40 results based on the 2000 samples. The CPU 130 fetches the 40 results as a single batch from the MCU 120 once every 1000 seconds. After each fetching, the CPU 130 performs further preset processing according to the 40 results. This batch fetching mechanism alleviates the burden of obtaining samples of the MCU 120 because the MCU 120 does not have to fetch the samples one by one from the sensor 110. Similarly, this batch fetching mechanism alleviates the burden of obtaining results of the CPU 130 because the CPU 130 does not have to fetch the results one by one from the MCU 120.

The CPU 130 executes the operating system (OS) and the applications of the mobile device 100. The further preset processing is just one of many tasks performed by the CPU 130. The MCU 120 is exclusively dedicated to performing the initial preset processing according to the samples and providing the one or more results or the signal to the CPU 130. The CPU 130 has much more processing power than the MCU 120 does and the CPU 130 consumes much more electric power than the MCU 120 does. The MCU 120 takes over the burden of collecting the samples from the sensor 110 and performing the initial preset processing from the CPU 130 so that the CPU 130 can sleep as long as possible in order to save power and extend the battery life of the mobile device 100. The batch fetching of results from the MCU 120 helps to reduce the waking frequency of the CPU 130, which saves more power. The MCU 120 constantly polls the sensor 110 and fetches the samples from the sensor 110. The MCU 120 never sleeps.

The CPU 130 may sleep until the CPU 130 wakes up to fetch the result from the MCU 120 or until the CPU 130 is woke up by the signal from the MCU 120. The MCU 120 may wake up the CPU 130 and notifies the CPU 130 to fetch the result from the MCU 120. Alternatively, the CPU 130 may wake up when the user of the mobile device 100 launches an application or when a timer expires. In other words, the CPU 130 may wake up without notification from the MCU 120, and then the CPU 130 may fetch the one or more results from the MCU 120.

Figure 2:
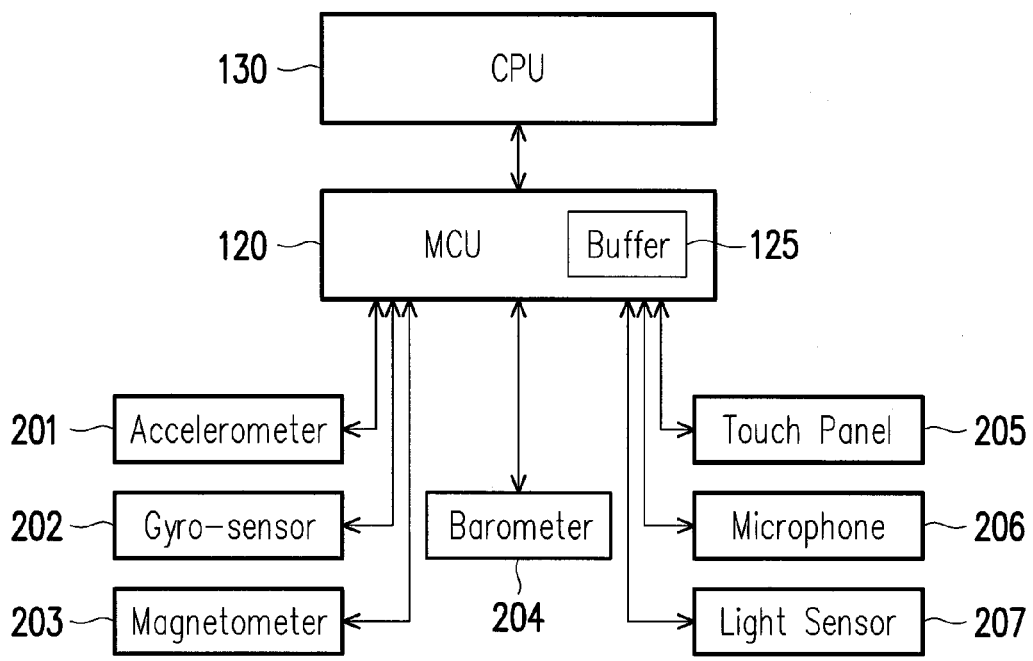
FIG. 2 is a schematic diagram showing a mobile device according to another embodiment of the present invention.

FIG. 2 is a schematic diagram showing a mobile device 200 according to another embodiment of the present invention. The mobile device 200 includes the CPU 130, the MCU 120, and seven sensors 201-207, namely, the accelerometer 201, the gyro-sensor 202, the magnetometer 203, the barometer 204, the touch panel 205, the microphone 206, and the light sensor 207. The accelerometer 201 generates samples of accelerations associated with movements and rotations of the mobile device 200. The gyro-sensor 202 generates samples of angular velocities associated with movements and rotations of the mobile device 200. The magnetometer 203 generates samples of magnetism associated with movements and rotations of the mobile device 200. The barometer 204 generates samples of atmospheric pressures associated with movements and rotations of the mobile device 200. The touch panel 205 generates samples of locations touched by the user of the mobile device 200. The microphone 206 generates samples of sound around the mobile device 200. The light sensor 207 generates samples of the ambient brightness around the mobile device 200. Each of the sensors 201-207 may include a buffer as the sensor 110 does.

The MCU 120 is coupled to all of the sensors 201-207 and operates as a sensor hub. Each subset of the mobile device 200 including the CPU 130, the MCU 120, and one of the sensors 201-207 may operate in the same ways as the mobile device 100 shown in FIG. 1 does. In addition, the MCU 120 and the CPU 130 may perform preset processing based on samples generated by multiple sensors altogether. In another embodiment of the present invention, the mobile device 200 may include less than seven sensors or more than seven sensors.

In an embodiment of the present invention, the mobile device 200 may provide the function of a pedometer. The MCU 120 fetches the samples from the accelerometer 201 and performs the initial preset processing by calculating how many steps the user of the mobile device 200 has walked according to the samples. The MCU 120 may store the result of the initial preset processing, namely, the number of steps, in the buffer 125.

The MCU 120 may wake up the CPU 130 to fetch the result every N steps, wherein N is a preset positive integer. Alternatively, the CPU may wake up periodically to fetch the result from the MCU 120. Alternatively, the CPU may wake up whenever the user launches an application to see the number of steps. The infrequent awakening of the CPU 130 saves energy. Sometimes the user walks for hours and does not want to see the number of steps until the user arrives at home. In this case, the CPU 130 may sleep for hours and saves a lot of energy.

In addition to counting the number of steps, the initial preset processing performed by the MCU 120 may include calculating the direction and the distance of each step of the user according to the samples generated by the accelerometer 201, the gyro-sensor 202, and the magnetometer 203. The MCU 120 may store the results, namely, the directions and distances of the steps, in the buffer 125. The MCU 120 may wake up the CPU 130 and notifies the CPU 130 to fetch the results when the size of the results reaches a preset percentage of the capacity of the buffer 125.

When the CPU 130 wakes up, the further preset processing performed by the CPU 130 may include displaying the number of steps, displaying a chart showing the number of steps in each hour, or plotting the trace of the user according to the directions and the distances of the steps, etc.

In another embodiment of the present invention, the mobile device 200 may provide functions of positioning and navigation based on the Global Positioning System (GPS). The user may turn off the GPS function to save power. The CPU 130 sleeps when the GPS function is turned off. During the period when the GPS function is turned off, the MCU 120 may fetch the samples generated by the accelerometer 201, the gyro-sensor 202, and the magnetometer 203 to calculate the moving trace of the mobile device 200. The MCU 120 may store the moving trace in the buffer 125 as the result of the initial preset processing. When the user turns on the GPS function, the CPU 130 may fetch the moving trace from the MCU 120 and use the moving trace and the last GPS position of the mobile device 200 to calculate a reference position so that the CPU 130 can find the current GPS position of the mobile device 200 faster.

In another embodiment of the present invention, the MCU 120 may calculate the moving trace of the mobile device 200 according to the samples generated by the barometer 204 in addition to the samples generated by the accelerometer 201, the gyro-sensor 202, and the magnetometer 203, so that the moving trace can include more accurate estimation of the change of altitude of the mobile device 200.

In another embodiment of the present invention, the mobile device 200 may switch between an unlocked state and a locked state. The mobile device 200 receives input from the touch panel 205 normally in the unlocked state, while the mobile device 200 does not receive input from the touch panel 205 in the locked state. The CPU 130 sleeps in the locked state. For example, the mobile device 200 may enter the locked state from the unlocked state when the mobile device 200 has been idle for a preset period of time, and the mobile device 200 may return to the unlocked state when the user performs a preset operation on the mobile device 200.

The preset operation for unlocking the mobile device 200 may be drawing a preset trace on the touch panel 205. In this case, the MCU 200 may fetch the samples generated by the touch panel 205 and analyse the samples to determine whether the user draws the preset trace or not. When the user finishes the preset trace on the touch panel 205, the MCU 120 may send a signal, such as an interrupt, to wake up the CPU 130. The CPU 130 switches the mobile device 200 from the locked state to the unlocked state in response to the signal.

Alternatively, the preset operation for unlocking the mobile device 200 may be speaking a preset password to the microphone 206. In this case, the MCU 200 may fetch the samples generated by the microphone 206 and perform speech recognition on the samples to determine whether the user speaks the preset password or not. When the user speaks the preset password to the microphone 206, the MCU 120 may send a signal to wake up the CPU 130. The CPU 130 switches the mobile device 200 from the locked state to the unlocked state in response to the signal.

Alternatively, the preset operation for unlocking the mobile device 200 may be holding the mobile device 200 and moving the mobile device 200 along a preset trace. In this case, the MCU 200 may fetch the samples generated by the accelerometer 201, the gyro-sensor 202, and the magnetometer 203 and analyse the samples to determine whether the mobile device 200 has moved along the preset trace or not. When the mobile device 200 has moved along the preset trace, the MCU 120 may send a signal to wake up the CPU 130. The CPU 130 switches the mobile device 200 from the locked state to the unlocked state in response to the signal.

In another embodiment of the present invention, the mobile device 200 may include a display. The MCU 120 may fetch the samples generated by the light sensor 207 and analyse the samples to calculate the average ambient brightness of the mobile device 200 over a recent period of time with a predetermined length. The MCU 120 may store the average ambient brightness in the buffer 125. The CPU 130 may fetch the average ambient brightness periodically and adjusts the display brightness of the display according to the average ambient brightness.

Figure 3:
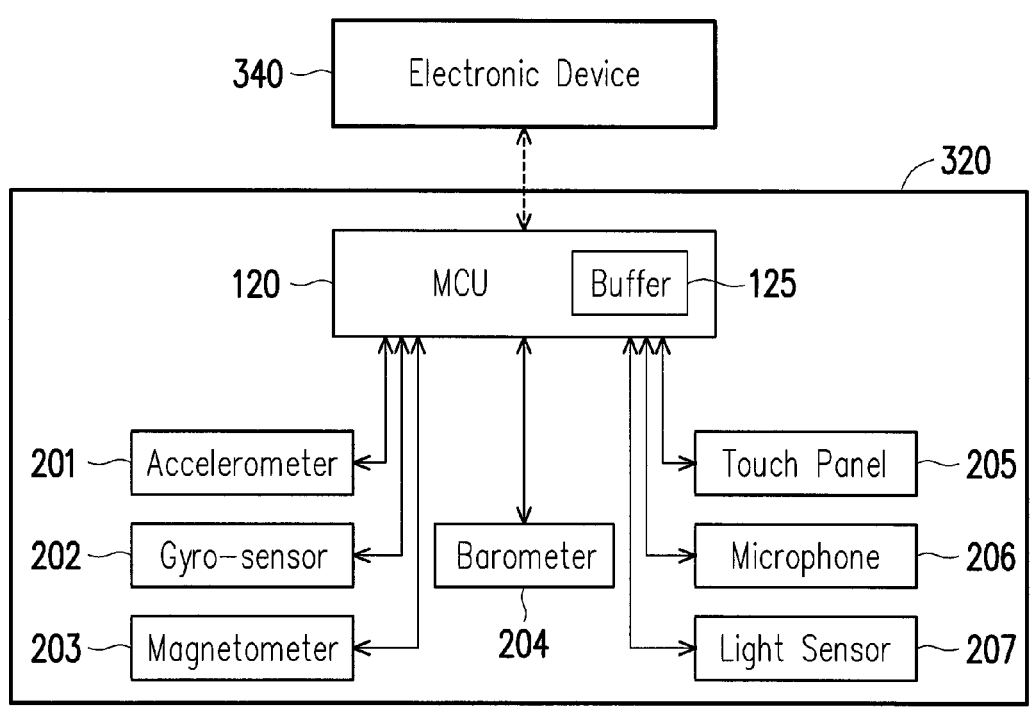
FIG. 3 is a schematic diagram showing a mobile device according to another embodiment of the present invention.

FIG. 3 is a schematic diagram showing a mobile device 320 according to another embodiment of the present invention. The mobile device 320 includes the MCU 120 and the sensors 201-207. Similar to the previous embodiments, the MCU 120 may fetch the samples generated by one or more of the sensors 201-207 and performs the initial preset processing according to the samples. The MCU 120 may store the samples and/or the result(s) of the initial preset processing in the buffer 125. The MCU 120 in this embodiment is configured to connect to the electronic device 340 through a wireless connection or a wired connection. The MCU 120 is further configured to provide the result(s) of the initial preset processing to the electronic device 340 through the wireless connection or the wired connection. The electronic device 340 may perform further preset processing according to the one or more results. In some aspects, the electronic device 340 is analogous to the CPU 130 in the previous embodiments.

For example, the mobile device 320 may be a wearable electronic pedometer. The MCU 120 counts the number of steps walked by the user according to the samples generated by the accelerometer 201. The MCU 120 may store the number of steps in the buffer 125. In addition, the MCU 120 may provide the number of steps to the electronic device 340 for further viewing or processing.

For another example, the mobile device 320 may be a small device attachable to a palm or an arm of a user or a golf stick wielded by the user. When the user plays golf, the MCU 120 may fetch the samples generated by the accelerometer 201, the gyro-sensor 202, and the magnetometer 203 to calculate the number of swings of the golf stick made by the user. The MCU 120 may store the number of swings in the buffer 125. In addition, the MCU 120 may provide the number of swings to the electronic device 340 for further viewing or processing.

Alternatively, the MCU may analyse the samples generated by the accelerometer 201, the gyro-sensor 202, and the magnetometer 203 to obtain the time and force of each swing of the golf stick made by the user. The MCU 120 may store the results of the analysis in the buffer 125. In addition, the MCU 120 may provide the results of the analysis to the electronic device 340 for further viewing or processing.

In summary, the MCU provided by the present invention is a sensor hub with a buffer. The MCU can take over the burden of collecting and analysing the samples generated by the sensors from the CPU of a mobile device. As a result, the MCU alleviates the burden of the CPU and the CPU may sleep as long as possible to save energy and extend the battery life of the mobile device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile device, comprising:
   a sensor, generating a plurality of samples;
   a microcontroller unit (MCU), coupled to the sensor, comprising a first buffer, fetching the samples from the sensor, performing a first preset processing according to the samples, and storing the samples and/or a result of the first preset processing in the first buffer; and
   a central processing unit (CPU), coupled to the MCU, fetching the result from the MCU or receiving a signal based on the result from the MCU, and performing a second preset processing according to the result or the signal;
   wherein the result or the samples are fetched in batches so as to reduce power consumption.

2. The mobile device of claim 1, wherein the sensor generates the samples at a first frequency, the MCU fetches the samples from the sensor in batches at a second frequency, the MCU performs the first preset processing according to the samples to generate a plurality of results of the first preset processing, the CPU fetches the results from the MCU in batches at a third frequency, the first frequency is higher than or equal to the second frequency and the second frequency is higher than or equal to the third frequency.

3. The mobile device of claim 2, wherein the sensor comprises a second buffer, the sensor stores the samples in the second buffer, and the MCU stores the results in the first buffer.

4. The mobile device of claim 1, wherein the CPU has more processing power than the MCU does and the CPU consumes more electric power than the MCU does.

5. The mobile device of claim 1, wherein the CPU sleeps until the CPU wakes up to fetch the result from the MCU or until the CPU is woke up by the signal from the MCU, while the MCU never sleeps.

6. The mobile device of claim 5, wherein the MCU wakes up the CPU and notifies the CPU to fetch the result from the MCU.

7. The mobile device of claim 5, wherein the CPU wakes up without notification from the MCU and then the CPU fetches the result from the MCU.

8. The mobile device of claim 1, wherein the MCU is exclusively dedicated to performing the first preset processing according to the samples and providing the result or the signal to the CPU.

9. A mobile device, comprising:
a sensor, generating a plurality of samples; and
a microcontroller unit (MCU), coupled to the sensor, comprising a first buffer, fetching the samples from the sensor, performing a preset processing according to the samples, storing the samples and/or a result of the preset processing in the first buffer, and providing the result or a signal based on the result to an electronic device;
wherein the samples are fetched in batches so as to reduce power consumption.

10. The mobile device of claim 9, wherein the sensor generates the samples at a first frequency, the MCU fetches the samples from the sensor in batches at a second frequency, the MCU performs the preset processing according to the samples to generate a plurality of results of the preset processing, the MCU provides the results to the electronic device in batches at a third frequency, the first frequency is higher than or equal to the second frequency and the second frequency is higher than or equal to the third frequency.

11. The mobile device of claim 10, wherein the sensor comprises a second buffer, the sensor stores the samples in the second buffer, and the MCU stores the results in the first buffer.

12. The mobile device of claim 9, wherein the MCU never sleeps and is exclusively dedicated to performing the preset processing according to the samples and providing the result or the signal to the electronic device.

13. A microcontroller unit (MCU), comprising:
a buffer,
wherein the MCU fetches a plurality of samples from a sensor, the MCU performs a preset processing according to the samples, the MCU stores the samples or a result of the preset processing in the buffer, and the MCU provides the result or a signal based on the result to an electronic device;
wherein the samples are fetched in batches so as to reduce power consumption.

14. The MCU of claim 13, wherein the sensor generates the samples at a first frequency, the MCU fetches the samples from the sensor in batches at a second frequency, the MCU performs the preset processing according to the samples to generate a plurality of results of the preset processing, the MCU stores the results in the buffer and provides the results to the electronic device in batches at a third frequency, the first frequency is higher than or equal to the second frequency and the second frequency is higher than or equal to the third frequency.

15. The MCU of claim 13, wherein the MCU never sleeps and is exclusively dedicated to performing the preset processing according to the samples and providing the result or the signal to the electronic device.

16. A mobile device, comprising:
a sensor, generating a plurality of samples;
a microcontroller unit (MCU), coupled to the sensor, comprising a first buffer, fetching the samples from the sensor, performing a first preset processing according to the samples, and storing the samples and/or a result of the first preset processing in the first buffer, wherein a number of times the MCU fetches the samples during a first time interval is smaller than a number of times the sensor generates one of the samples during the first time interval; and
a central processing unit (CPU), coupled to the MCU, fetching the result from the MCU or receiving a signal based on the result from the MCU, and performing a second preset processing according to the result or the signal, wherein a number of times the CPU fetches the result during a second time interval is smaller than a number of times the MCU fetches the samples during the second time interval;
wherein the number of times the MCU fetches the samples during the first time interval is smaller than the number of times the sensor generates one of the samples during the first time interval to reduce power consumption of the mobile device, and the number of times the CPU fetches the result during the second time interval is smaller than the number of times the MCU fetches the samples during the second time interval to reduce power consumption of the mobile device.

17. The mobile device of claim 16, wherein the sensor generates the samples at a first frequency, the MCU fetches the samples from the sensor in batches at a second frequency, the MCU performs the first preset processing according to the samples to generate a plurality of results of the first preset processing, the CPU fetches the results from the MCU in batches at a third frequency, the first frequency is higher than or equal to the second frequency and the second frequency is higher than or equal to the third frequency.

18. The mobile device of claim 17, wherein the sensor comprises a second buffer, the sensor stores the samples in the second buffer, and the MCU stores the results in the first buffer.

19. The mobile device of claim 16, wherein the CPU has more processing power than the MCU does and the CPU consumes more electric power than the MCU does.

20. The mobile device of claim 16, wherein the CPU sleeps until the CPU wakes up to fetch the result from the MCU or until the CPU is woke up by the signal from the MCU, while the MCU never sleeps.

21. The mobile device of claim 20, wherein the MCU wakes up the CPU and notifies the CPU to fetch the result from the MCU.

22. The mobile device of claim 20, wherein the CPU wakes up without notification from the MCU and then the CPU fetches the result from the MCU.

23. The mobile device of claim 16, wherein the MCU is exclusively dedicated to performing the first preset processing according to the samples and providing the result or the signal to the CPU.

24. A mobile device, comprising:
a sensor, generating a plurality of samples;
a microcontroller unit (MCU), coupled to the sensor, comprising a first buffer, fetching the samples from the sensor in batches, performing a first preset processing according to the samples, and storing the samples and/or a result of the first preset processing in the first buffer; and a central processing unit (CPU), coupled to the MCU, fetching the result from the MCU in batches or receiving a signal based on the result from the MCU, and performing a second preset processing according to the result or the signal;

wherein the MCU fetches the samples from the sensor in batches, and the CPU fetches the result from the MCU in batches to reduce power consumption of the mobile device.

\* \* \* \* \*